Figure 1:
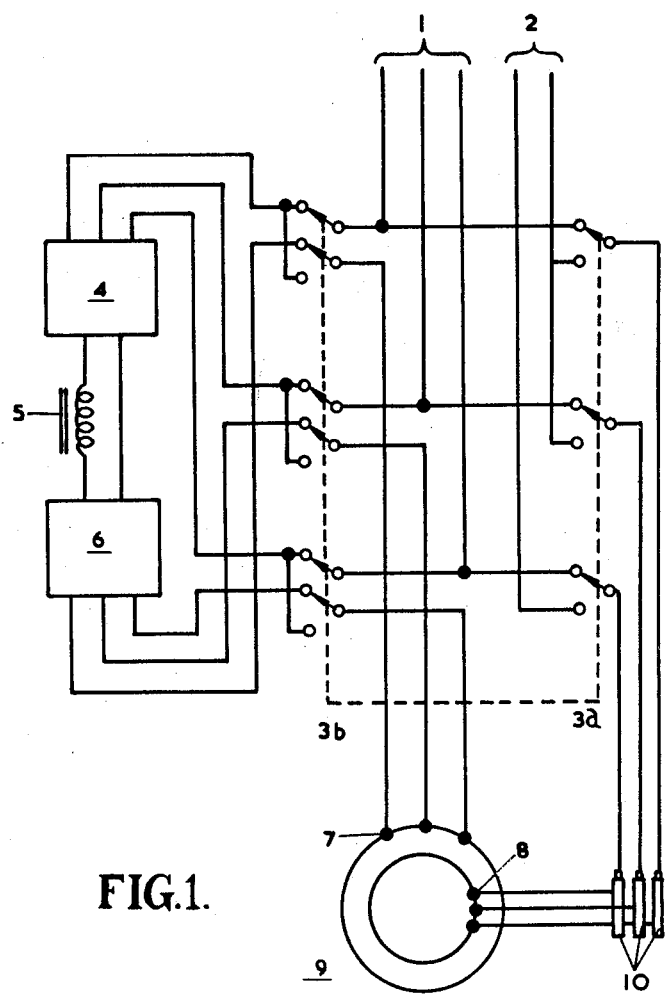

Sept. 8, 1964  R. M. DAVIS  3,148,320
SYNCHRONOUS INDUCTION MOTOR SPEED CONTROL
Filed May 11, 1961  3 Sheets-Sheet 2

Inventor
REX M. DAVIS
By *mawkinney mawkinney*
Attorneys

United States Patent Office 3,148,320
Patented Sept. 8, 1964

3,148,320
SYNCHRONOUS INDUCTION MOTOR
SPEED CONTROL
Rex M. Davis, Loughborough, Leicestershire, England, assignor to Brush Electrical Engineering Company Limited, Loughborough, England
Filed May 11, 1961, Ser. No. 109,392
Claims priority, application Great Britain May 14, 1960
6 Claims. (Cl. 318—171)

The invention relates to a system of controlling the speed of a synchronous induction motor, which is to be fed with a three-phase supply (for example, from an engine-driven alternator), particularly in the case where the motor is for driving a locomotive.

It has hitherto been proposed to control the speed of a synchronous motor by varying the phase of the armature current, its amplitude, or both of these, by a static frequency converter device consisting of two bridges comprising controlled single anode valves, one of these bridges being connected to the armature and the other to an external energy source, and the two bridges being connected together in such a manner as to permit a transfer of energy in both directions between the source and armature. Starting the motor, however, can only be achieved if grid control is applied to the bridge connected to the energy source, in addition to the necessary grid control applied to the bridge connected to the motor. At low speeds when the back E.M.F. of the rotating motor is insufficient for natural communtation of the valves comprising the motor bridge, artificial commutation by grid control of both bridges in synchronism with motor shaft rotation must be employed.

It has also been proposed hitherto, to control the speed of a slip ring induction motor by returning the slip power to the supply (or supplying it from the supply if the slip is negative) by means of a static frequency converter device consisting of two bridges comprising controlled single anode valves, one of the bridges being connected to the secondary terminals of the machine and the other to an external energy source which also supplies the primary of the machine, and the two bridges being connected together in such a manner as to permit the transfer of energy in both directions between the source and the secondary of the motor.

Both of the above proposals suffer from disadvantages when applied to a motor which must deliver a constant horsepower output over a wide speed range, such as a traction motor. The synchronous motor requires a relatively complex starting procedure with grid control applied to both bridges. The slip ring motor current is approximately inversely proportional to speed, while the slip voltage rises linearly as the speed is reduced. At the lowest speeds, therefore, the slip power is many times the useful power of the motor, imposing a weight, size and cost penalty upon the static frequency changer. It is the object of the present invention to obviate the above disadvantages.

According to the invention use is made of a synchronous induction motor of which the speed, at synchronism with its three-phase supply, is small as compared with its maximum speed, and use is made of a switch means which, during running of the motor at below synchronous speed, is adapted to apply the slip energy appearing at the stator to a rectifier connected to feed, through a choke, an inverter which, in turn, is adapted to feed its output to the three-phase supply at the voltage and frequency of the latter, whereby the speed of the motor is controlled by the firing angle of the inverter, the switch means being also adapted, when a D.C. excitation of the rotor windings produces a sufficient A.C. stator voltage for the obtaining of natural commutation of the inverter, to be operated to connect the supply for the motor through the rectifier and inverter to drive the motor from the output of the inverter over a wide speed range.

It will be seen that, by the method of the invention, use can be made of a rectifier/choke/inverter combination, acting as static frequency converter, which can be made very much smaller than in the prior proposals, and that energy is transferred through it only in one direction.

By suitable choice of the ratio of synchronous speed (to three-phase supply) to maximum speed, the maximum slip power at starting can be limited to twice the shaft power of the motor or less.

The inverter can be a mercury arc or a solid state, controlled rectifier.

Figure 2:
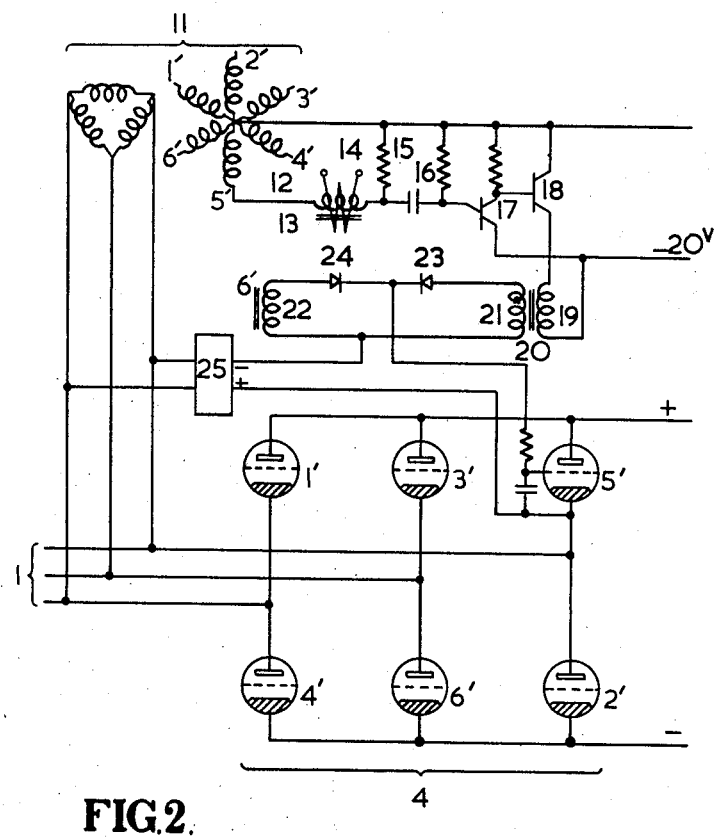
Figure 3:
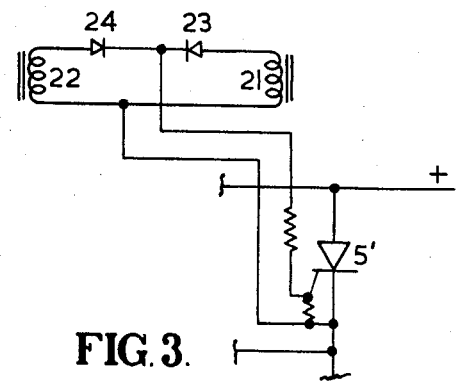
Figure 4:
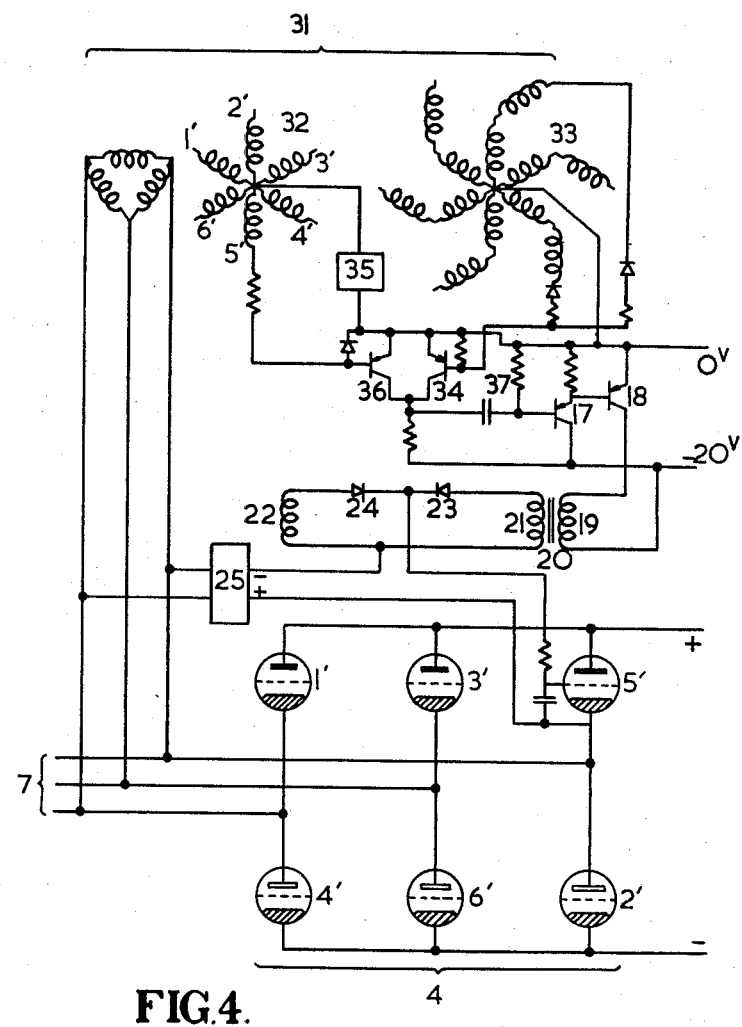

One arrangement in accordance with the invention is illustrated by the drawings:

FIGURE 1 is a main circuit diagram;
FIGURE 2 is a circuit diagram of a firing angle control for the lower speed range when the inverter incorporates mercury arc devices;
FIGURE 3 is a diagram like FIGURE 2 but in the case where the inverter incorporates solid state devices instead of mercury arc devices, and
FIGURE 4 illustrates a firing angle control circuit for use in the higher speed range.

In FIGURE 1 a three-phase supply is indicated at 1, a D.C. excitation supply at 2, respective series of contacts of the switch means at 3a and 3b, an inverter at 4, and a choke and rectifier respectively at 5 and 6. The stator and rotor, 7 and 8 respectively, of the synchronous induction motor 9 of which the speed is to be controlled, and the motor slip rings 10 are arranged in the circuit as shown.

The whole speed range is divided into two regions. The first, or starting region, which is obtained with the switches 3a and 3b operated to the full line positions shown, covers motor speeds lower than synchronism to the three-phase supply 1 which latter, in these conditions, is fed through switch contacts 3a to the slip rings 10, and thence to the rotor 8. The slip energy appearing at the stator 7 is fed through switch contacts 3b to the rectifier 6 which converts the slip energy to D.C. This D.C. is fed through choke 5 to the inverter 4, which latter is arranged to convert the D.C. slip energy to A.C. at the frequency and voltage of the three-phase supply 1. The speed of the motor 9 is thus controlled in this region by the firing angle of the inverter, which is determined by the inverter grid control circuits (not shown).

The motor 9 can be switched, by operating switches 3a and 3b to the dotted line positions shown, to the second, higher speed range at any speed above the minimum speed for which the D.C. excitation supply 2 fed to the rotor winding 8 produces sufficient voltage in the stator windings 7 for natural commutation of the inverter 4 to occur. In this higher speed range the motor 9 behaves as a synchronous motor supplied from the output of the inverter. Thus, the three-phase supply 1 is fed through switch contacts 3b to the rectifier 6 and then, as D.C. through the choke 5, to the inverter 4. The latter requires the E.M.F. induced in the stator 7 by the D.C. excited rotating rotor 8 to permit natural commutation. The speed of the motor is now controlled by the balance between D.C. supply voltage to the inverter, and the back E.M.F. of the inverter which is dependent on the A.C. voltage at the motor terminals and the firing angle.

The stator 7 frequency and, therefore, speed of the motor 9 can now rise to any desired level within the mechanical limitations of the motor, and the electrical limitations of the inverter.

The variation of D.C. excitation with speed can, if required, be used to give the motor a constant horsepower characteristic, which has the added advantage that the stator 7 voltage is constant with rising speed, thus requiring a smaller rectifier and inverter than that required for a motor with constant torque characteristics.

The role of stator 7 and rotor 8 can be exchanged without altering the principle of operation.

The grid control system for the inverter 4 has to perform two functions, the first during the starting region when the inverter is feeding power to the A.C. supply 1, and a wide variation of firing angle control is required, and the second during the higher speed region when the inverter 4 is feeding power to the motor over a wide range of frequency, and only a small range of firing angle control is required. Although a single grid control system could be provided for both functions it is easier to employ two separate systems for the separate functions.

FIGURE 2 shows one method by which grid control may be achieved during the starting region. A three phase transformer 11 has its primary supplied from the supply 1, and has six secondary windings providing six voltages, each displaced 60° from that of the adjacent windings. The said secondary windings supply identical circuits, only one of which is shown in FIGURE 2. A saturating transformer 12 has an A.C. winding 13 connected between one secondary of the transformer 11 and a load resistor 15, and it also has a D.C. winding 14 which controls the instant in the half cycle of A.C. voltage at which the transformer core saturates and, therefore, passes on to the resistor 15 the majority of the A.C. voltage. A resistor-capacitor circuit 16 provides at the instant of saturation a short pulse which is amplified by transistors 17, 18 and developed across the primary 19 of a pulse transformer 20. The output from the secondary 21 of the pulse transformer, and the output from the secondary 22 of an adjacent circuit are combined with the diodes 23 and 24, thus providing two pulses at an interval of 60°, repeated every 360°. These pulses provide a suitable grid control signal for each of the six arms of the inverter 4.

If the inverter is of the mercury arc type, it also requires a D.C. negative bias voltage applied to the grids, each of which can be supplied by a separate transformer and rectifier 25. On the other hand, a solid state inverter using Silicon Controlled Rectifiers, for example, does not require the negative bias voltage, and the pulses appearing at the common point of diodes 23 and 24 may be applied directly to the silicon controlled rectifier gates, as shown in FIGURE 3. Control of phase, which in turn controls the motor speed, is achieved by varying the current in the D.C. control windings 14, all six of which may be series connected for common control.

FIGURE 4 shows one method of deriving a correctly phase control signal during the higher speed region. The transistor amplifier, pulse transformer and connection to the grids or gates of the inverter are precisely as described above, but because of the wide frequency range, and significant waveform disturbances caused by the commutation of the inverter, it is preferred to employ the following method which is not influenced by these factors.

A three phase transformer 31 has a six phase star secondary 32 and a six phase inter-star tertiary 33. The circuitry concerned with one phase only is shown for the sake of simplicity. The two signals from the tertiary windings to the base of transistor 34 ensure that no spurious grid pulses are produced during the unwanted period of each cycle. The D.C. bias 35 and the signal from the secondary 32 allow transistor 36 to switch off a variable delay time after transistor 34 has switched off during the period of 60° to 0° angle of advance. The period 60° to 30° angle of advance is covered by reducing the D.C. bias from maximum value positive to zero, and the period 30° to 0° angle of advance is covered by increasing the bias from zero to maximum value negative. By deriving the D.C. bias voltage from the same supply to which transformer 31 is connected, the firing angle is made independent of voltage variations. The collectors of transistors 34, 36 are connected to a common load, and a negative pulse is produced by a resistor-capacitor circuit 37. This pulse is fed to the transistor amplifier as described for FIGURE 2. The circuitry is repeated for the other five phases as before.

What I claim as my invention and desire to secure by Letters Patent of the United States is:

1. Means for controlling the speed of a synchronous induction motor of which the speed, at synchronism with a three-phase supply, is small as compared with its maximum speed, comprising a rectifier, a choke, an inverter, means for controlling the firing angle of the inverter, and a switch means, said switch means operable to connect the motor rotor windings to a three-phase supply and to apply the resultant slip energy appearing at the motor stator to said rectifier and through said coke to said inverter such that said inverter feeds its output to the three-phase supply at the voltage and frequency of the latter, whereby the speed of the motor up to synchronous speed is controlled by the firing angle of said inverter, and said switch means operable when said motor has achieved synchronous speed to apply a D.C. excitation to the motor rotor windings so as to produce a sufficient A.C. motor stator voltage for the obtaining of natural commutation of said inverter, and to connect the three-phase supply for the motor through said rectifier, choke and inverter to drive the motor from the output of said inverter over a wide speed range determined by controlling the firing angle of the inverter.

2. Means, according to claim 1, in which it is arranged for the ratio of synchronous speed (to three-phase supply) to maximum speed to be chosen such that the maximum slip power at starting does not exceed twice the shaft power of the motor.

3. Means for controlling the speed of a synchronous induction motor of which the speed, at synchronism with a three-phase supply, is small as compared with its maximum speed, comprising a rectifier, a choke, an inverter, means for controlling the firing angle of the inverter, and a switch means, said inverter constituted by a mercury arc rectifier, said switch means operable to connect the motor rotor windings to a three-phase supply and to apply the resultant slip energy appearing at the motor stator to said rectifier and through said coke to said inverter such that said inverter feeds its output to the three-phase supply at the voltage and frequency of the latter, whereby the speed of the motor up to synchronous speed is controlled by the firing angle of said inverter, and said switch means operable when said motor has achieved synchronous speed to apply a D.C. excitation to the motor rotor windings so as to produce a sufficient A.C. motor stator voltage for the obtaining of natural commutation of said inverter, and to connect the three-phase supply for the motor through said rectifier, choke and inverter to drive the motor from the output of said inverter over a wide speed range determined by controlling the firing angle of the inverter.

4. Means, according to claim 3, in which it is arranged for the ratio of synchronous speed (to three-phase supply) to maximum speed to be chosen such that the maximum slip power at starting does not exceed twice the shaft power of the motor.

5. Means for controlling the speed of a synchronous induction motor of which the speed, at synchronism with a three-phase supply, is small as compared with its maximum speed, comprising a rectifier, a choke, an inverter, means for controlling the firing angle of the inverter, and a switch means, said inverter constituted by a solid state controlled rectifier, said switch means operable to connect the motor rotor windings to a three-phase supply and to apply the resultant slip energy appearing at the motor stator to said rectifier and through said choke to said inverter such that said inverter feeds its output to the three-phase supply at the voltage and frequency of the latter, whereby the speed of the motor up to synchronous speed is controlled by the firing angle of said inverter, and said switch means operable when said motor has achieved synchronous speed to apply a D.C. excitation to the motor rotor windings so as to produce a sufficient A.C. motor stator voltage for the obtaining natural commutation of said inverter, and to connect the three-phase supply for the motor through said rectifier, choke and inverter to drive the motor from the output of said inverter over a wide speed range determined by controlling the firing angle of the inverter.

6. Means, according to claim 5, in which it is arranged for the ratio of synchronous speed (to three-phase supply) to maximum speed to be chosen such that the maximum slip power at starting does not exceed twice the shaft power of the motor.

References Cited in the file of this patent
FOREIGN PATENTS
803,957    Great Britain _____ Nov. 5, 1958